(12) United States Patent
Baxter et al.

(10) Patent No.: US 7,607,018 B2
(45) Date of Patent: Oct. 20, 2009

(54) METHOD AND APPARATUS FOR COLLECTING ELECTRONIC SIGNATURES

(75) Inventors: Samuel C. Baxter, Fairport, NY (US); Thomas J. Colson, Clarence, NY (US)

(73) Assignee: IP.com, Inc., West Henrietta, NY (US)

( * ) Notice: Subject to any disclaimer, the term of this patent is extended or adjusted under 35 U.S.C. 154(b) by 741 days.

(21) Appl. No.: 10/475,780

(22) PCT Filed: May 8, 2001

(86) PCT No.: PCT/US01/14727

§ 371 (c)(1),
(2), (4) Date: Oct. 23, 2003

(87) PCT Pub. No.: WO02/091145

PCT Pub. Date: Nov. 14, 2002

(65) Prior Publication Data

US 2005/0102520 A1 May 12, 2005

(51) Int. Cl.
*H04L 9/00* (2006.01)

(52) U.S. Cl. ..................................................... 713/176
(58) Field of Classification Search .................. 713/176
See application file for complete search history.

(56) References Cited

U.S. PATENT DOCUMENTS

| | | | | |
|---|---|---|---|---|
| 5,005,200 A | * | 4/1991 | Fischer | ........................ 380/30 |
| 5,689,567 A | * | 11/1997 | Miyauchi | ..................... 713/176 |
| 5,745,598 A | | 4/1998 | Shaw et al. | |
| 5,818,955 A | * | 10/1998 | Smithies et al. | ............. 382/115 |
| 5,825,880 A | * | 10/1998 | Sudia et al. | .................. 713/180 |
| 6,064,751 A | | 5/2000 | Smithies et al. | |
| 6,079,018 A | * | 6/2000 | Hardy et al. | .................. 713/170 |
| 6,081,610 A | | 6/2000 | Dwork et al. | |
| 6,148,093 A | * | 11/2000 | McConnell et al. | ......... 382/119 |
| 6,154,841 A | | 11/2000 | Oishi | |
| 6,158,003 A | * | 12/2000 | Kara | .......................... 713/168 |
| 6,163,841 A | | 12/2000 | Venkatesan et al. | |
| 6,167,518 A | * | 12/2000 | Padgett et al. | ............... 713/186 |
| 7,024,562 B1 | * | 4/2006 | Flink et al. | ................... 713/186 |
| 7,143,290 B1 | * | 11/2006 | Ginter et al. | ................. 713/176 |
| 2003/0023851 A1 | * | 1/2003 | Peha | .......................... 713/176 |

FOREIGN PATENT DOCUMENTS

WO    WO 00/11619 A1    8/1999

* cited by examiner

*Primary Examiner*—Gilberto Barron, Jr.
*Assistant Examiner*—Devin Almeida
(74) *Attorney, Agent, or Firm*—Simpson & Simpson, PLLC

(57) ABSTRACT

A method of collecting and authenticating electronic signatures and documents signed thereby, including the steps of storing a representation of a first handwritten signature and an associated first authenticated electronic signature of a first signatory in a database, storing a representation of a second handwritten signature and an associated second authenticated electronic signature of a second signatory in the database, creating a message digest for a document file associated with a document to be signed, appending the message digest to the document file, transmitting the document file with the appended message digest to the first and second signatories, receiving the document file with the appended message digest from the first and second signatories after the first and second signatories have affixed their first and second electronic signatures, respectively, to the document file, and, authenticating the first and second signatures, respectively, and the electronically signed document file. An apparatus for implementing the method is also disclosed.

23 Claims, 2 Drawing Sheets

METHOD AND APPARATUS FOR COLLECTING ELECTRONIC SIGNATURES

TECHNICAL FIELD

The present invention relates to a method and apparatus for collecting and authenticating electronic signatures.

BACKGROUND ART

With the pace of business growing exponentially, it is essential to be able to collect legible signatures from multiple signatories in multiple geographic locations in order to close business transactions within required time frames, while assuring the authenticity of the signatures and the integrity of the legal documents being executed. As a result, there is a need, on an expedited basis, to establish the identity of parties in multiple locations and their intent to be legally bound to the documents executed in a business transaction.

Contract Formation

The cornerstone of every business deal is the contract that embodies the agreement between the parties. In times past, a contract was commonly formed by the handshake of two parties. Parties knew each other and their reputations, and lived in the same community.

Eventually, important legal transactions, such as the purchase of real property, were memorialized in a written instrument and the identity of the seller was verified by a notary public. The instrument was (and still is) recorded in a central repository such as the local county clerk's office, in order to put the world on notice of the transaction and reduce the likelihood of fraud. Whether oral or written, each step in the process involved the physical presence of the signatories. Unlike electronic transactions, establishing the identity of the parties and their intent to sign the document presented to them was a relatively easy task.

Document Production

The method by which contractual documents are produced significantly impacts the integrity of the documents and the time involved from deal formation to closing. Documents were originally handwritten, and later typed. The advent of carbon paper resulted in reliable copies each person signing the document could review and retain. Copy and facsimile machines achieved the same result much more quickly.

However, all of these methods of document production require the physical presence of signers, or a trusted third party to physically circulate documents for signature such as a courier, the postal service or overnight delivery services. The use of third parties adds a major time factor to closure of a transaction, results in additional cost, and injects uncertainty due to the increased risk of physical loss of the documents. Furthermore, while documents are being circulated, business circumstances can change and parties may refuse to sign. The travel time required for multiple parties to physically meet at one location (e.g., a law firm) to close a deal is prohibitive. Thus, parties are forced to weigh the safety and certainty of physically getting parties together for a formal closing versus the cost and time involved. The advent of fax machines has facilitated the closing of business transactions but is of limited value in major transactions with numerous documents. Pages can be mixed up or missing. Due to the length of many documents, signature pages are often circulated alone. This is a dangerous practice leaving parties unsure as to what they are signing. Faxed signatures may also be illegible and thus repudiated.

Online Contracting/Use of Electronic Signatures

The consummation of business transactions in an electronic environment has become a necessity for businesses seeking to maintain a competitive advantage in a global marketplace. As with any transaction, signatures of the parties are required to close the deal and the use of traditional "wet" signatures in an entirely electronic environment was quickly recognized as inadequate. Electronic signatures evolved in response to this need. An electronic signature is an electronic sound, symbol or process attached to or logically associated with a record and executed or adopted by a person with the intent to sign the record. There are many types of electronic signatures. For example, an electronic signature can be as simple as a name typed at the bottom of a page. However, due to concerns regarding security and authenticity, more sophisticated technologies are used, including a digitized image of a handwritten signature, a digital signature using encryption and public key architecture, and biometric signatures (thumbprint, voiceprint, retinal scan, palm scan, DNA analysis). As further security, an electronic signature can be electronically witnessed using digital or biometric technology.

Concerns regarding authenticity extend not only to electronic signatures but to the documents being signed. Techniques such as digital fingerprinting, using a public domain algorithm such as the MD5 Message-Digest Algorithm (RFC 1321), developed at the Massachusetts Institute of Technology, are used to enable authentication and prove that a document has not been altered. The document may also be time and date stamped through a digital notarization process.

Clearly, the technology to deal with individual electronic signature verification or document verification is available. What is needed is a system and method for quickly and safely collecting electronic signatures from multiple signatories in multiple geographic locations and appending them to authenticated documents in order to consummate critical, time-sensitive transactions.

Removal of Legal Barriers to Use Electronic Signatures

A major barrier to the development of online contracting has been the fear that a party attempting to repudiate the contract would successfully argue that it was not in written form as required by statute and thus not valid. As recently as 1996, a Georgia court ruled that a faxed document did not constitute a valid written notice of claim. *Department of Transportation v. Norris et al.*, 222 Ga. App. 361; 474 S.E.2d 216 (1996) ("It may also be added that a facsimile transmission does not satisfy the statutory requirement that notice be 'given in writing.' Such a transmission is an audio signal via a telephone line containing information from which a writing may be accurately duplicated, but the transmission of beeps and chirps along a telephone line is not a writing, as that term is customarily used. Indeed, the facsimile transmission may be created, transmitted, received, stored and read without a writing, in the traditional sense, or a hard copy in the technical vernacular, having ever been created.") Contrast this with other government agencies, such as the U.S. Patent and Trademark Office, which not only recognize, but encourage transmission of documents by facsimile, and recognize signatures on documents transmitted by facsimile. 37 C.F.R. §1.6(d)("Except in the cases enumerated below, correspondence, including authorizations to charge a deposit account, may be transmitted by facsimile.")

In response to this concern, 46 out of 50 states have adopted some form of electronic signature statute. Many are patterned after the Uniform Electronic Transactions Act (UETA) that was promulgated by the National Conference of Commissioners on Uniform State Laws in July, 1999. Although a few states adopted legislation dealing specifically with digital signatures, most state electronic signature statutes are technology neutral and thus flexible enough to embrace future technologies that may be developed.

New York enacted the Electronic Signatures and Records Act on Mar. 27, 2000 (N.Y. State Technology Law Sections 101-109 (1999)). This act is not based on the UETA but shares some of its attributes, such as being technology neutral. It provides that the use of signatures made electronically has the same validity and effect as the use of a signature affixed by hand. The New York law also enhances and clarifies the authority of state government to create and retain records in electronic form.

On Oct. 1, 2000, the federal Electronic Signatures in Global and National Commerce Act (E-SIGN) became effective. This federal law was passed due to concerns about the lack of uniformity among various state statutes. E-SIGN provides that a signature relating to a transaction may not be denied legal effect, validity or enforceability solely because it is in electronic form. It further provides that a contract relating to a transaction affecting interstate commerce may not be denied legal effect, validity, or enforceability solely because an electronic signature or electronic record was used in its formation. E-SIGN specifically authorizes the use of electronic means to notarize, acknowledge, or verify documents.

Similar to the UETA, E-SIGN is technology-neutral and is designed to ensure that parties who elect to use electronic signatures and records may do so with confidence that they carry the same force and effect as non-electronic signatures and records.

Benefits of the Invention

E-SIGN has eliminated concerns that a contract formed and signed electronically would be found invalid. However, ensuring the validity of the contract that is created is only the first step. Each party to the transaction must be confident that the document he or she reviewed and approved is the one that he or she signed, and must be confident that the electronic signature appearing on the document is in fact that of the party to be bound. This must all be achieved on an expedited basis in order to meet deal deadlines. The inability to meet crucial deadlines can result in the failure of multimillion-dollar deals to close or the inability of a company to pursue other deals due to time spent on closing current ones. Traditional methods of collecting signatures in connection with business transactions are too slow, too costly, and/or too fraught with uncertainty to be viable in the New Economy.

Implementation of a system and method for collecting and authenticating electronic signatures that uses both an electronic signature and a signature image, and the creation of a repository of such signatures for fast and reliable use in closings could greatly reduce the time, expense and risk involved in the closing of business transactions and provide a significant, measurable benefit to global commerce. Thus, a system and method for collecting and authenticating electronic signatures would permit businesses to quickly establish the identity of contracting parties and their intention to be bound to the authenticated documents they sign, regardless of the parties' physical location. Not only is this an issue for business-to-business transactions, it would conceivably apply to and benefit business-to-consumer transactions as well.

Others have patented inventions related to digital/electronic signatures, although to date no one has provided a comprehensive solution as described herein.

For example, U.S. Pat. No. 6,167,518, "Digital signature providing non-repudiation based on biological indicia," assigned to Commercial Electronics, LLC (New York, N.Y.), describes a digital certificate formed from a digitized representation of a unique biological feature of a registrant, for example, the registrant's chromosomal DNA. The digital representation is signed with the registrant's private encryption key and transmitted to a certificate authority. The registrant's identity is verified at a remote registration terminal. When the registrant's identity has been verified the certificate authority forms the certificate by encrypting the digital signature with the certificate authority's own encrypting key. The certificate is also held in a publicly available directory. The certificate is used to authenticate an electronic document by appending the certificate to the electronic document. The document and the certificate are then transmitted to a receiving terminal. The identity of the transmitting party can be verified by inspecting the certificate. In the event the sending party denies sending the document, the biological feature can be extracted from the certificate and directly compared with the actual biological feature of the sending party.

U.S. Pat. No. 6,021,491, "Digital signatures for data streams and data archives," assigned to Sun Microsystems, Inc. (Palo Alto, Calif.), describes methods, apparatuses and products for verifying the authenticity of data within one or more data files. Each data file is provided with an identifier, such as a one-way hash function or cyclic redundancy checksum. A signature file, that includes the identifiers for one or more data files, is provided with a digital signature created with a signature algorithm. The data file(s) and signature file are then transferred, or otherwise provided to a user. The user verifies the digital signature in the signature file using a signature-verifying algorithm. Once verified as being authentic, the signature file can be used to verify each of the data files. Verification of the data files can be accomplished by comparing the identifier for each data file with the corresponding identifier in the signature file. If the identifiers in the data and signature files match, then the data file can be marked as authentic. If the identifiers do not match then the data file can be rejected or otherwise dealt with accordingly.

U.S. Pat. No. 5,915,024, "Electronic signature addition method, electronic signature verification method, and system and computer program product using these methods," assigned to Kabushiki Kaisha Toshiba (Kawasaki, Japan), describes an apparatus for adding an electronic signature to document data including a delimiter character detector for dividing the input document data into a plurality of divided document data by using as a delimiter a predetermined character appearing in a document represented by the document data, a digest generator and an encrypter for generating an electronic signature based on the divided document data for each divided document data, and a signature-added message generator for generating the divided document data, the electronic signature based on the divided document data, and information for associating the divided document data with the electronic signature.

U.S. Pat. No. 6,091,835, "Method and system for transcribing electronic affirmations," assigned to PenOp Limited (Somerset, United Kingdom), describes a method and system for recording a detailed record or "transcript" of the acts, events and forensic circumstances related to a party's affirmation of an electronic document, transaction or event. The transcript is recorded in a data object made secure through the use of encryption and a checksum. The system directs a ceremony whereby the party affirming the document, transaction or event is required to undertake a series of steps in order to successfully complete the affirmation and have the affirmation recorded; thus participation in the ceremony must take place before an affirmation will be accepted. The steps of the controlled procedure serve to gather evidence to confirm specifics such as that the affirming party: i) is in fact the identified party; ii) understands that by entering affirming data, e.g. a password, key, biometric sample or other affirming data he or she is thereby affirming or becoming legally accountable for the undertakings of the document, transaction or event triggered by computer interaction; iii) has adequately reviewed the document, transaction or statement to be affirmed (where a client application presents such a document transaction or statement to the system of the present invention); and iv) understands the undertaking of an event or the provisions within the document, transaction or statement and the consequences of affirming it. The system of the present invention is flexible and can be configured to accept all types of biometric, infometric and cryptographic signatures or affirming acts, such as those created by passwords, secret cryptographic keys, unique secret numbers, biometric recordings such as handwritten signatures or other biometric information, or multi-media recordings of affirming statements. It also permits the affirmation procedure to be tailored to the specifics of a client application through the use of an authentication policy component.

U.S. Pat. No. 6,064,751, "Document and signature data capture system and method," assigned to PenOp Limited (Somerset, United Kingdom), describes a computer-based method and system for capturing and verifying a handwritten signature. The handwritten signature may relate to a document, such as an electronically stored document. An image of the document is displayed. A user signs the document electronically, and the handwritten signature is electronically captured. A set of measurements relating to the handwritten signature is determined and stored in a signature envelope. Optionally, a checksum of a checksum of the document can be determined and stored in the signature envelope. The claimed identity of the signatory can also be stored in the signature envelope. The signature envelope is encrypted. The signature envelope can be communicated to another application or computer platform, or stored for later verification. The signature envelope is decrypted, and the set of measurements stored in the signature envelope are compared against a known set of handwritten signature measurements to verify the identity of the signatory. The system includes a database of signature templates storing verified signature information. The verified set of signature measurements are compared with the set of measurements stored in the signature envelope to obtain a similarity score. The present invention includes a gravity prompt feature to alert the signatory as to the nature, seriousness and/or contents of what is being signed. The gravity prompt can be stored in the signature envelope as part of the record of the signing event.

There are several important differences between the present invention and the patents discussed above. A first difference is that the present invention utilizes a public domain message digest, where certain background patents use encryption keys. A second difference is that the present invention utilizes both an electronic signature and a signature image, where certain background patents use only one of these forms of signature. A third difference is that the present invention is intended to verify that signatories in multiple locations have reviewed and signed identical documents, where certain background patents are solely intended to verify the identity of the signatory.

Thus, there is a long felt and demonstrated need for an invention that solves the problem of collecting and authenticating electronic signatures to facilitate closing deals in a fast, cost-effective manner without sacrificing the safety and integrity of the transaction.

DISCLOSURE OF INVENTION

The present invention comprises a system for collecting electronic signatures that captures authenticated electronic signatures and the dates of each signature, and packages the document and signatures together for transfer and submittal. The invention includes a method of collecting electronic signatures that captures authenticated electronic signatures and the dates of each signature, and packages the document and signatures together for transfer and submittal. The invention further includes a method of pre-registering signatories and collecting signatures to be stored in a central electronic repository. The invention also includes a method of printing documents with a signature image, where the printed document with the signature image is validated with an associated electronic package containing the document, an electronic signature, and electronic notarization. The invention includes a method of signaling that an impending document deadline is approaching and all required signatures have not been obtained. Finally, the invention comprises an apparatus for implementing the method of the invention.

A general object of the invention is to provide a method and apparatus for obtaining multiple signatures from multiple signatories located in multiple geographies in a timely fashion.

Another object of the invention is to provide improved readability and decrease the number of signature pages required on a document.

A further object of the invention is to provide more robust proof that multiple parties have signed identical documents.

Still another object of the invention is to provide a faster method of aggregating multiple signatures from multiple geographies into a single document.

Still a further object of the invention is to provide a mechanism to signal that an impending document deadline is approaching and all required signatures have not been obtained.

Yet another object of the invention is to provide inherent document redundancy, because each signatory is provided a signed, electronic copy of the document.

Yet a further object of the invention is to provide more vigorous and diligent proof of an original document and signature compared with documents with handwritten signatures.

These and other objects, advantages and features of the present invention will become readily apparent to those having ordinary skill in the art upon a review of the following detailed description of the invention in view of the drawings and claims.

MODES FOR CARRYING OUT THE INVENTION

The present invention comprises a method and apparatus for collecting, witnessing, authenticating and notarizing a plurality of electronic signatures associated with business, legal and other transactions. In a preferred embodiment, the electronic signatures emanate from different locations, and are associated with business documents, legal documents, or the like. The present invention provides a means of electronically witnessing the signatures, automatically notarizing each signature, ensuring secure transmission of electronic files associated with the signatures, signaling that an impending transaction deadline is approaching and that all required signatures have not been obtained, and providing automatic submission of electronic files associated with the signatures together with the electronic signatures themselves to a target authority and/or record keeper. In addition, the present invention provides a registration process by which each signatory may create a pre-determined signature profile, including biographic information, a graphic representation of the signatory's signature, and a digital signature to be used to electronically sign documents. The digital signature may also be used to provide a printable version of a document being signed.

It should be appreciated that the present invention finds applications in a variety of fields, including business and law. The word "transaction" is used herein to include a number of relationships between two or more parties. A transaction may be a "deal", a "contract", an "assignment", a "license", a "lease", or any other relationship between two or more parties. The transaction need not be a legal transaction at all. It could be a business transaction. For example, executives in multiple locations can "sign off" on a major decision or expenditure, book reviewers can "sign off" on a book review, academic or professional committee members can "sign off" on meeting minutes. In addition to these "business" transactions, there are numerous legal transactions accommodated by the present invention. For example, mergers and acquisitions, conventionally closed by convening all interested parties in one location for document execution can now be closed with the present invention from remote locations. Collecting signatures on documents commonly routed, such as assignment and power of attorney/declaration documents associated with a patent application, can now be executed without routing. These are but a few representative examples of some applications of the present invention.

Figure 1:
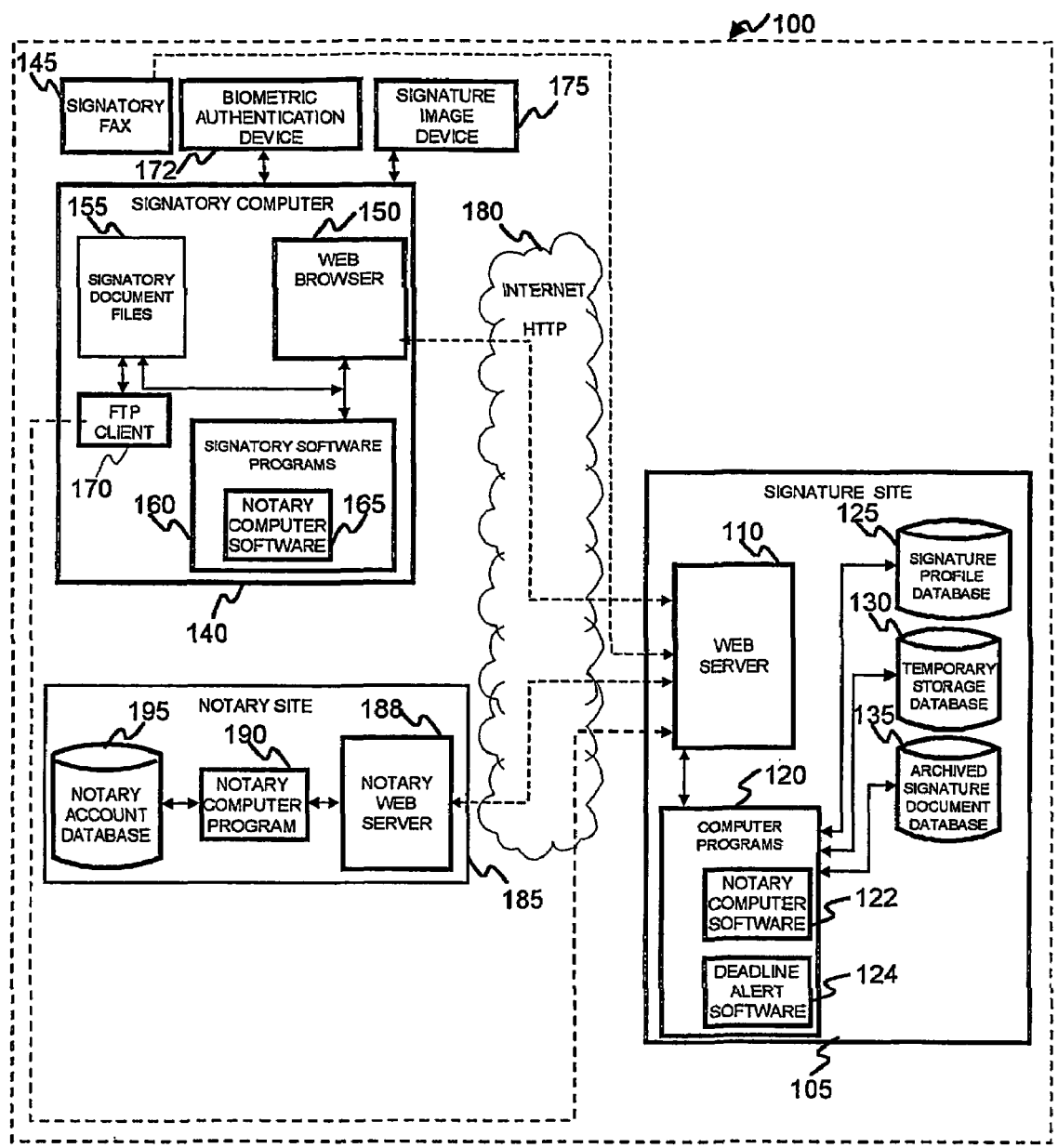
FIG. 1 is a block diagram of the apparatus of the invention.
Figure 2:
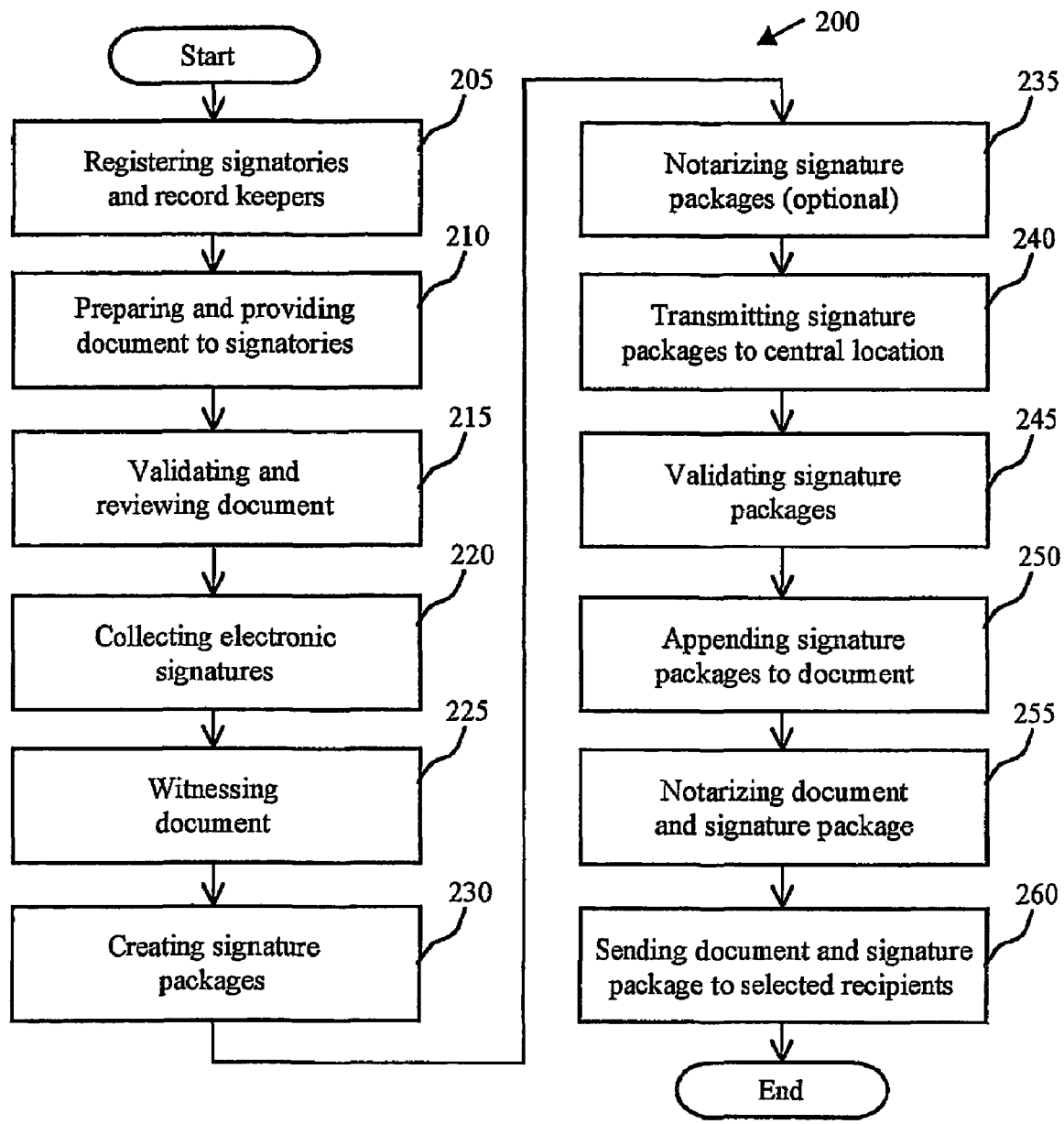
FIG. 2 is a flow chart of the method of the invention.

Adverting now to the drawings, FIG. 1 illustrates apparatus 100 for collecting electronic signatures and FIG. 2 illustrates the method of the invention. It should be appreciated, then, that the system of the invention includes both a method and apparatus to implement the method. The apparatus includes a plurality of computers interconnected in a network. In a preferred embodiment, at least one client computer is in communication with a server computer via a global information network, although they may be interconnected via any suitable network. Also, in a preferred embodiment, the global information network used is the Internet.

System 100 includes signature site 105, signatory computer 140, signatory fax 145, biometric authentication device 172, signature image device 175, connection to Internet 180, and notary site 185. Signature site 105 includes Web server 110 linked to a computer program 120 that contains notary computer software 122 and deadline alert software 124, and in turn is linked to signature profile database 125, temporary storage database 130, and archived signature document database 135.

Signatory computer 140 further includes Web browser 150 (such as Microsoft® Internet Explorer or Netscape® Navigator®), set of signatory document files 155, set of signatory software programs 160 that contains notary software program 165, and FTP client 170. Signatory computer 140 may link to signature site 105 via the Internet 180 using standard hypertext transfer protocol (HTTP) or using File Transfer Protocol (FTP) protocol more directly. Signatory fax 145 is electrically connected to signatory computer 140, and is used to receive facsimiles electronically from signature site 105. Biometric authentification device 172 and signature image device 175 are also electronically connected to signatory computer 140 to provide electronic signature data for the present invention. Notary site 185 further includes notary Web server 188 linked to notary computer program 190, which is in turn linked to notary database 195.

FIG. 2 is a flow chart illustrating method 200 for collecting electronic signatures, and includes the following steps:

Step 205: Registering Signatories and Record Keepers

In this step, signatories register by providing necessary information to electronically sign a document. In this way, a profile of each electronic signature is established in a central location and can be used for signature verification, including subsequent occasions. As an optional step, a signatory registers profile information with a central location, such as a computer server. Profile information includes pre-determined identifying information for the signatory, such as signatory name, e-mail address, and telephone number. Next, the signatory provides an electronic signature using some form of biometric authentification device, which captures information via methods such as thumbprint or palm scan, retinal scan, or DNA analysis. In one example, the biometric authentification device is an "Ethenticator MS3000," a thumbprint-scanning device, manufactured by Ethentica, which is available commercially (for less than $200) at http://www.ethentica.com/. The signatory then uses another device to capture his or her handwritten signature image, such as the "SignIt" product offered commercially by Communication Intelligence Corporation (CIC) (see http://www.penop.com/). The profile, electronic signature, and handwritten signature image are packaged and stored in the central location.

Step 210: Preparing and Providing Document to Signatories

In this step, the document requiring signatures is prepared and provided to each signatory in either electronic or hard copy format. To prepare the document, a one-way hash function (hereafter called a "message digest function") is created for the document in a central location, using a public domain algorithm such as the MD5 Message-Digest Algorithm (RFC 1321). The message digest that is created when the algorithm is applied to the file consists of a unique string of 128 bits. According to the MIT Laboratory for Computer Science and RSA Data Security, Inc. Web site at http://www.landfield.com/rfcs/rfc1321.html/, "it is conjectured that it is computationally infeasible to produce two messages having the same message digest, or to produce any message having a given pre-specified target message digest." Therefore, the MD5 message digest can be used to uniquely identify a file by producing a digital signature.

The message digest that is produced is appended to the document file. In one example, the message digest is appended to the document by adding it to the document properties fields. The document is then ready for transmittal to all signatories.

In one example, the document is e-mailed from signature site 105 to signatory computer 140. In other examples, the document may be faxed from signature site 105 to signatory fax 145, mailed as a hard copy or as an electronic file on disk that may be read by signatory computer 140, or may be provided for download to signatory computer 140 via the Internet 180. E-mail security and Internet security of file transmission may be accomplished by using standard secure socket layer (SSL) or similar security measures.

Document preparation optionally includes activating deadline alert software 124, which is designed to send an alert to one or more destinations at a pre-determined time prior to reaching the date the document and all signatures are due back to the central location. In one example, deadline alert software 124 sends an e-mail message to one or more pre-designated addresses. Other examples include sending an automatic fax or displaying an on-screen message.

In operation, a user at signature site 105 opens deadline alert software 124 and activates the alert function. The user designates to whom notification will be sent, and selects the amount of advanced notice (e.g., 1 day, 1 week) needed prior to the document and signature deadline. If the document and signatures are received prior to the deadline, the user deactivates deadline alert software 124. If the schedule reaches the designated alert time and all signatures have not been received by signature site 105, deadline alert software 124 automatically sends an alert (such as an e-mail) to the pre-designated addresses. Repeated messages may be sent at regular intervals until the outstanding signatures are collected.

Step 215: Validating and Reviewing Document

In this step, each signatory reviews the document (e.g., for technical accuracy or legal language). Before reviewing the document, the signatory runs the message digest algorithm to ensure that the document has not been altered in transmission. If the signatory-generated message digest matches the message digest embedded in the document, it has not been altered. If the signatory-generated message digest does not match the message digest embedded in the document, the signatory must resolve the problem prior to reviewing and signing the document.

Step 220: Collecting Electronic Signatures

In this step, once the signatory determines willingness to sign the document, the signatory provides an electronic signature using biometric authentification device 172, such as the Ethentica MS3000 described above or other similar device. The electronic signature is captured and stored in signatory document files 155 on signatory computer 140.

Step 225: Witnessing Document

In an optional step, the signatory may require a second person to electronically witness the document signing by providing a second electronic signature. The witness' purpose is to verify that the identity of the person electronically signing the document and the signature used are the same. The witness also uses biometric authentification device 172, such as the Ethentica MS3000 described above or similar device to provide an electronic witness to the first signature. The witness' signature is captured and stored in signatory document files 155 on signatory computer 140.

Step 230: Creating Signature Packages

In this step, the message digest is linked or bundled with the electronic signature file (and the witness' signature, if applicable) to form a signature package. In a preferred embodiment, commercially available WinZip software is used to package the files together, although other compression or "zipping" software can be used.

Step 235: Notarizing Signature Package

In an optional step, the signatory transfers the signature package from signatory computer 140 via the Internet 180 to a notary site 185. Notary site 185 time and date stamps (and thus electronically notarizes) the signature package. In a preferred embodiment, notary site 185 is Surety.com. Other sites that could perform the same function include Timestamp.com, and DigiStamp.com.

Step 240: Transmitting Signature Packages to Central Location

In this step, the signatory transfers the signature package from signatory computer 140 to signature site 105, where the signature package is stored in temporary storage database 130 prior to validation. In one example, the signatory package is transferred via e-mail that uses standard SSL technology to ensure transmission security. Other methods include file transfer via the Internet 180, file transfer using FTP client 170, or file transfer by mailing a disk that contains the signature package to a central location. The signatory may elect to use additional security measures such as message encryption and password protection.

Step 245: Validating Signature Packages

In this step, signature site 105 validates each signature package by (1) running the message digest algorithm to ensure the document that was reviewed is identical to the one originally provided, and (2) comparing the received signature with the registered signatures to verify the signatory. If any of the signature packages are invalid, the signatory in question is contacted to resolve the problem before method 200 proceeds.

Step 250: Appending Signature Packages to Document

In this step, all necessary signature packages are appended to the original document. In one example, the packages are appended by using WinZip to combine them into a "zipped" archive. In another example, the files are created from commercially available word processing software, such as Microsoft® Word. The appending process includes the steps of successively opening each file, and copying and pasting the contents into a document and signature package file, where pasting is done in a predetermined format. Once complete, the files are closed.

Step 255: Notarizing Document and Signature Package

In this step, the complete document and signature package are send to notary site 185 to be time and date stamped. In one example, notary site 185 is Surety.com; other examples include Timestamp.com, and DigiStamp.com. Notary site 185 returns the document and signature package with an added notarization file, which is appended to the signature package.

Step 260: Sending Document and Signature Package to Selected Recipients

In this step, the document and notarized signature package are sent to selected recipients. The recipients may include the signatories, a target destination to process the document, or a record keeper for filing. In one example, the record keeper is a computer database on signature site 105 designed to file and retain a copy of the document for future use. Other examples of record keepers include a computer with a user designated as an administrative assistant for such documents, a separate third-party site designated for document storage, or a printer that automatically prints the document with electronic signature images from registered signatory profiles on the signature page. A record keeper may also be designated as the user responsible for activating and setting deadline alert software 124 as described in step 210. This step may be automated to occur upon receipt of a notarized document and signature package.

One potential operability issue with the present invention is that digital information can be lost or become corrupted. However, the built-in redundancy of the system provides a way to retain copies of documents and signatures in order to avoid this problem.

What is claimed is:

1. A method of collecting and authenticating an electronic signature and document signed thereby, comprising:

storing respective representations of first and second handwritten signatures for first and second signatories and associated first and second authenticated electronic signatures of said first and second signatories, respectively, in a database;

creating a message digest for a document file associated with a document to be signed;

appending said message digest to said document file;

transmitting said document file with said appended message digest;

accepting a representation of a first unauthenticated handwritten signature and a first unauthenticated electronic signature with respect to said transmitted document file;

accepting a second unauthenticated handwritten signature and a second unauthenticated electronic signature with respect to said transmitted document file as verification that an identity of an entity providing said first unauthenticated handwritten signature and said first unauthenticated electronic signature is the same as an identity for said first signatory;

receiving said document file with said appended message digest, said first and second unauthenticated handwritten signatures, and said first and second unauthenticated electronic signatures; and, comparing the stored first handwritten signature and the stored first authenticated electronic signature with the first unauthenticated handwritten signature and the first unauthenticated electronic signature, respectively, and the stored second handwritten signature and the stored second authenticated electronic signature with the second unauthenticated handwritten signature and the second unauthenticated electronic signature, respectively, to authenticate said first and second unauthenticated handwritten signatures, said first and second unauthenticated electronic signatures, and said electronically signed document file.

2. The method of collecting and authenticating electronic signatures and documents recited in claim 1 further comprising the step of storing a representation of a third handwritten signature and an associated third authenticated electronic signature of a third signatory in said database.

3. The method of collecting and authenticating electronic signatures and documents recited in claim 2, further comprising the steps of:

transmitting said document file with said appended message digest to said third signatory;

receiving said document file with said appended message digest from said third signatory after said third signatory has affixed his third unauthenticated electronic signature, respectively, to said document file; and, authenticating said third unauthenticated electronic signature, respectively, and said electronically signed document file.

4. The method, of collecting and authenticating electronic signatures and documents recited in claim 1 further comprising the step of registering profile information associated with said first electronic signature, where said registering is done in a central location.

5. The method of collecting and authenticating electronic signatures and documents recited in claim 4 wherein said profile comprises information is selected from the group consisting of signatory name, e-mail address and telephone number.

6. The method of collecting and authenticating electronic signatures and documents recited in claim 1 wherein said first electronic signature is biometrically authenticated.

7. The method of collecting and authenticating electronic signatures and documents recited in claim 2 wherein said third electronic signature is biometrically authenticated.

8. The method of collecting and authenticating electronic signatures and documents recited in claim 6 wherein said first electronic signature is biometrically authenticated by a method selected from the group consisting of thumbprint, fingerprint, palm scan, retinal scan, bodily fluid (including but not limited to blood and urine) and DNA analysis.

9. The method of collecting and authenticating electronic signatures and documents recited in claim 7 wherein said third electronic signature is biometrically authenticated by a method selected from the group consisting of thumbprint, fingerprint, palm scan, retinal scan, bodily fluid (including but not limited to blood and urine) and DNA analysis.

10. The method of collecting and authenticating electronic signatures and documents recited in claim 1 wherein said transmitting of said document file with said appended message digest is accomplished by e-mail.

11. The method of collecting and authenticating electronic signatures as recited in claim 1, further comprising the step of sending a deadline alert communication to at least one destination at a predetermined time prior to a desired date for signing said document.

12. The method of collecting and authenticating electronic signatures as recited in claim 11, wherein said deadline alert communication is sent to said first signatory.

13. The method of collecting and authenticating electronic signatures as recited in claim 1 further comprising the step of notarizing said document file after it has been electronically signed by said first signatory.

14. The method of collecting and authenticating electronic signatures as recited in claim 1 wherein authenticating said first and second unauthenticated handwritten signatures, said first and second unauthenticated electronic signatures, and said electronically signed document file comprises running an algorithm to ensure that said received document file is identical to said transmitted document file, and comparing said received unauthenticated first electronic signature with said authenticated first electronic signature.

15. The method of collecting and authenticating electronic signatures as recited in claim 14 wherein said algorithm is a message digest algorithm.

16. An apparatus for collecting and authenticating an electronic signature and document signed thereby, comprising:

means for storing respective representations of first and second handwritten signatures and associated first and second authenticated electronic signatures of first and second signatories, respectively, in a database;

means for creating a message digest for a document file associated with a document to be signed;

means for appending said message digest to said document file;

transmitting said document file with said appended message digest;

means for accepting a representation of a first unauthenticated handwritten signature and a first unauthenticated electronic signature with respect to said transmitted document file;

means for accepting a second unauthenticated handwritten signature and a second unauthenticated electronic signature with respect to said transmitted document file as verification that an identity of an entity providing said first unauthenticated handwritten signature and said first unauthenticated electronic signature is the same as an identity for said first signatory;

means for receiving said document file with said appended message digest, said first and second unauthenticated handwritten signatures, and said first and second unauthenticated electronic signatures; and, means for comparing the stored first handwritten signature and the stored first authenticated electronic signature with the first unauthenticated handwritten signature and the first unauthenticated electronic signature, respectively, and the stored second handwritten signature and the stored second authenticated electronic signature with the second unauthenticated handwritten signature and the second unauthenticated electronic signature, respectively, to authenticate said first and second unauthenticated handwritten signatures, said first and second unauthenticated electronic signatures, and said electronically signed document file.

17. The apparatus recited in claim 16 wherein said means for storing a representation of a first handwritten signature and an associated first authenticated electronic signature of a first signatory in a database comprises a signature image device and a computer operatively arranged to store said representation.

18. The apparatus recited in claim 16 wherein said means for creating a message digest for a document file associated with a document to be signed comprises a general-purpose computer specially programmed to run a message digest algorithm computer program.

19. The apparatus recited in claim 16 wherein said means for appending said message digest to said document file comprises a general purpose computer specially programmed to append said message digest to said document file.

20. The apparatus recited in claim 16 wherein said means for transmitting said document file with said appended message digest comprises a general purpose computer specially programmed to transmit said document file with said appended message digest.

21. The apparatus recited in claim 16 wherein said means for receiving said document file with said appended message digest, said first and second unauthenticated handwritten signatures, and said first and second unauthenticated electronic signatures comprises a general purpose computer specially programmed to receive said document file with said appended message digest.

22. The apparatus recited in claim 16 wherein said means for authenticating said first and second unauthenticated handwritten signatures, said first and second unauthenticated electronic signatures, and said electronically signed document file comprises a general purpose computer specially programmed to authenticate said first unauthenticated electronic signature and said electronically signed document file.

23. The apparatus recited in claim 16 wherein said means for authenticating said first and second unauthenticated handwritten signatures, said first and second unauthenticated electronic signatures, and said electronically signed document file comprises biometric authentication means.

* * * * *